United States Patent
Alten

(10) Patent No.: US 6,619,622 B1
(45) Date of Patent: Sep. 16, 2003

(54) AUTOMOTIVE JACK

(75) Inventor: Ferdinand Alten, Mandern (DE)

(73) Assignee: ThyssenKrupp Bilstein GmbH, Bochum (DE)

( * ) Notice: Subject to any disclaimer, the term of this patent is extended or adjusted under 35 U.S.C. 154(b) by 0 days.

(21) Appl. No.: 10/212,310

(22) Filed: Aug. 2, 2002

(30) Foreign Application Priority Data

Mar. 27, 2000 (DE) .......................................... 100 14 767

(51) Int. Cl.[7] .................................................. B66F 3/00
(52) U.S. Cl. .................................................... 254/126
(58) Field of Search .............................. 254/126, 122, 254/129, 88, 7 R, 7 B, 7 C, 8 B, DIG. 1, DIG. 4, 124

(56) References Cited

U.S. PATENT DOCUMENTS

| | | | | |
|---|---|---|---|---|
| 5,161,782 A | * | 11/1992 | Huang .......................... | 254/126 |
| 5,184,806 A | * | 2/1993 | Erschens et al. ............. | 254/126 |
| 5,685,659 A | * | 11/1997 | Brosius et al. ............... | 254/126 |
| 5,979,877 A | * | 11/1999 | Arguelles .................... | 254/126 |
| 5,988,594 A | * | 11/1999 | Gill ............................. | 254/126 |
| 6,022,001 A | * | 2/2000 | Palacio et al. ............... | 254/126 |

\* cited by examiner

*Primary Examiner*—Lee D. Wilson
(74) *Attorney, Agent, or Firm*—Max Fogiel

(57) ABSTRACT

An automotive jack with a vertical main structure resting on a ground and provided with a leg, a foot, and a load supporting arm swingable around a fixed horizontal axis on the leg. A threaded shaft is used for raising the arm away from lowering toward the ground; a vehicle-engaging component with a free end and a convex adapter head at the free end. The adapter head engages a matching concave recess below a bottom of a vehicle being lifted.

17 Claims, 4 Drawing Sheets

AUTOMOTIVE JACK

BACKGROUND OF THE INVENTION

The present invention concerns an automotive jack with a convex adapter head.

Jacks, especially those of the present genus, include a leg with a load-supporting arm pivoting on it with the arm's free end engaging or engaging below a recess or below a supporting surface in or on the vehicle being lifted. Such jacks entail problems. First, any relative rotation between the arm's free end and the vehicle must be compensated. Second, care must be taken to ensure that the arm's free end engages immovable against the vehicle. Various forms of attachment have been proposed for achieving this objective—with pivoting inserted mandrils, pivoting vehicle supporting plates, or, as disclosed in German 9 418 720 U1, convex adapter heads on the arm's free end.

Although the adapter head disclosed in German 9 418 720 U1 does provide some freedom in compensating the angular displacement between the jack and the vehicle, the embodiment has the drawback that the convex head can never be secured horizontally below the vehicle's bottom or sill. This in turn entails the risk that the jack can slip out of position as or after it lifts the vehicle, which can accordingly fall and severely injure the operator.

SUMMARY OF THE INVENTION

The object of the present invention is accordingly a simple, well defined, and reliable means of securing the convex adapter below the vehicle's bottom or sill.

The present invention features several advantages. The means of positioning the jack immovable below the vehicle being lifted are simple. A number of versions also ensure that the jack can be secured paralleling the length of the vehicle. Furthermore, an embodiment ensures that the operator, usually untrained in that jacks need to be resorted to very seldom at the present state of automotive technology, will need to have recourse to no additional means of establishing the pivoting component at the proper angle below the bottom of the vehicle.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
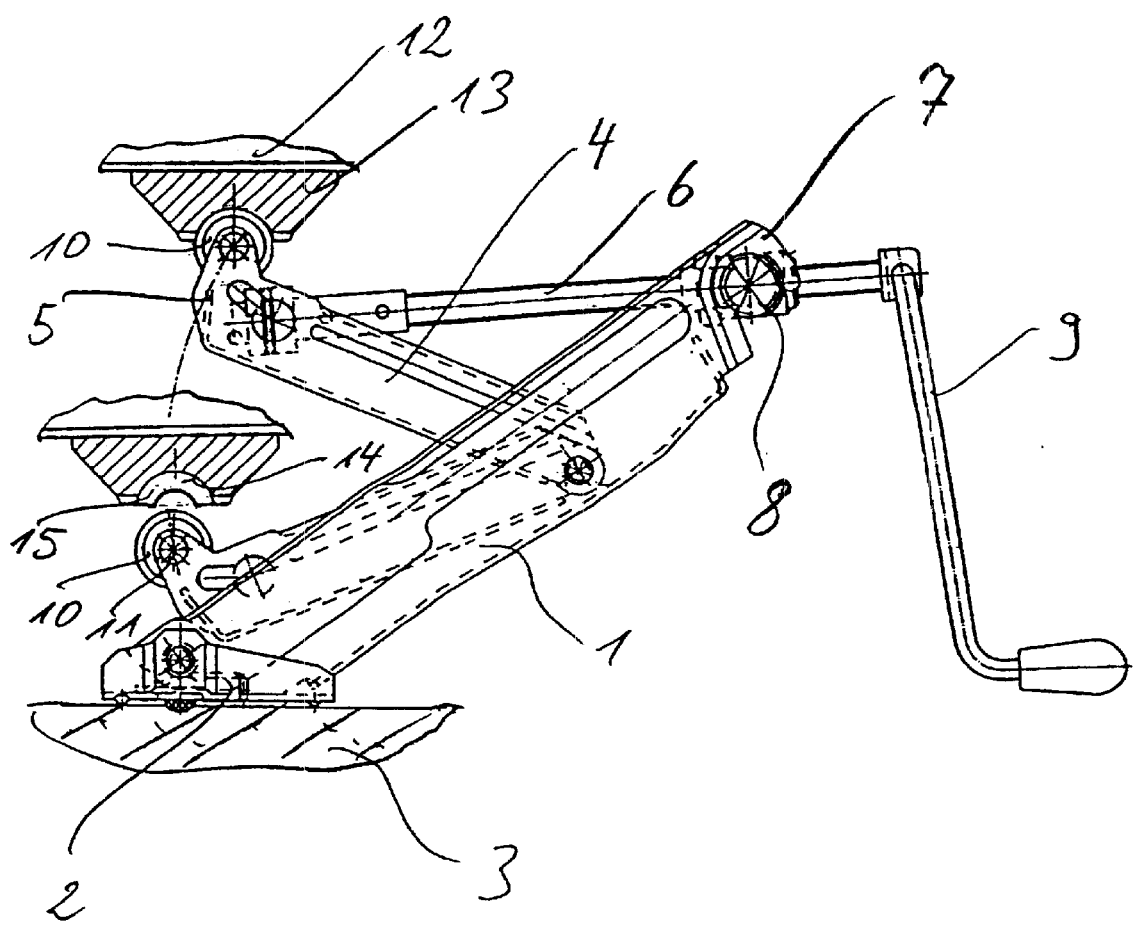
FIGS. 1 and 2 are views of the jack as a whole and FIGS. 3 and 4 are larger-scale depictions of the rollers employed as adapter heads.

The embodiment illustrated by way of example in the drawing is a single-arm articulated jack with a pivoting foot. Such jacks have a vertical main structure that comprises a leg 1 with a foot 2 pivoting on its lower end. The bottom of the foot rests on the ground 3. A load-supporting arm 4 is articulated to leg 1 near the latter's upper end. An unillustrated vehicle-engaging component is secured to the free end 5 of the arm.

Leg 1 and arm 4 are connected by a threaded shaft 6, with a traveling nut 8 pivoting in the illustrated embodiment on the upper end 7 of the leg. As shaft 6, which is usually provided with a handcrank, turns, accordingly, it forces arm 4 toward or away from leg 1, raising or lowering the free end 5 of arm 4 and hence varying the distance between the vehicle and ground 3.

Rotating on a shaft 11 at the free end 5 of the arm 4 in the illustrated example is a roller 10. Arm 4 is of sheet metal and has a conventional U-shaped cross-section, although lacking a web between its flanges in the vicinity of free end 5.

The roller 10 in the version illustrated in FIG. 1 is accommodated between the flanges of load-supporting arm 4, shaft 11 extending through and secured to them.

A vehicle-accommodating component 13 is mounted below the vehicle's bottom or sill 12. Component 13 is provided with a concave recess 14 of the same curvature as roller 10. Recess 14 is demarcated to the left and to the right by walls 15, creating a pocket with a vaulted base.

The two figures depict load-supporting arm 4 at two points of its stroke. With arm 4 farther down, the jack is ready for use. It will be evident that, with the device in this state, roller 10 can easily be positioned below vehicle-accommodating component 13. As arm 4 rises, then, the roller will engage recess 14 and, as the arm continues to rise, the vehicle itself will be lifted, the jack shifting into a state wherein the wheel to be removed is off ground 3 and can be replaced.

Figure 2:
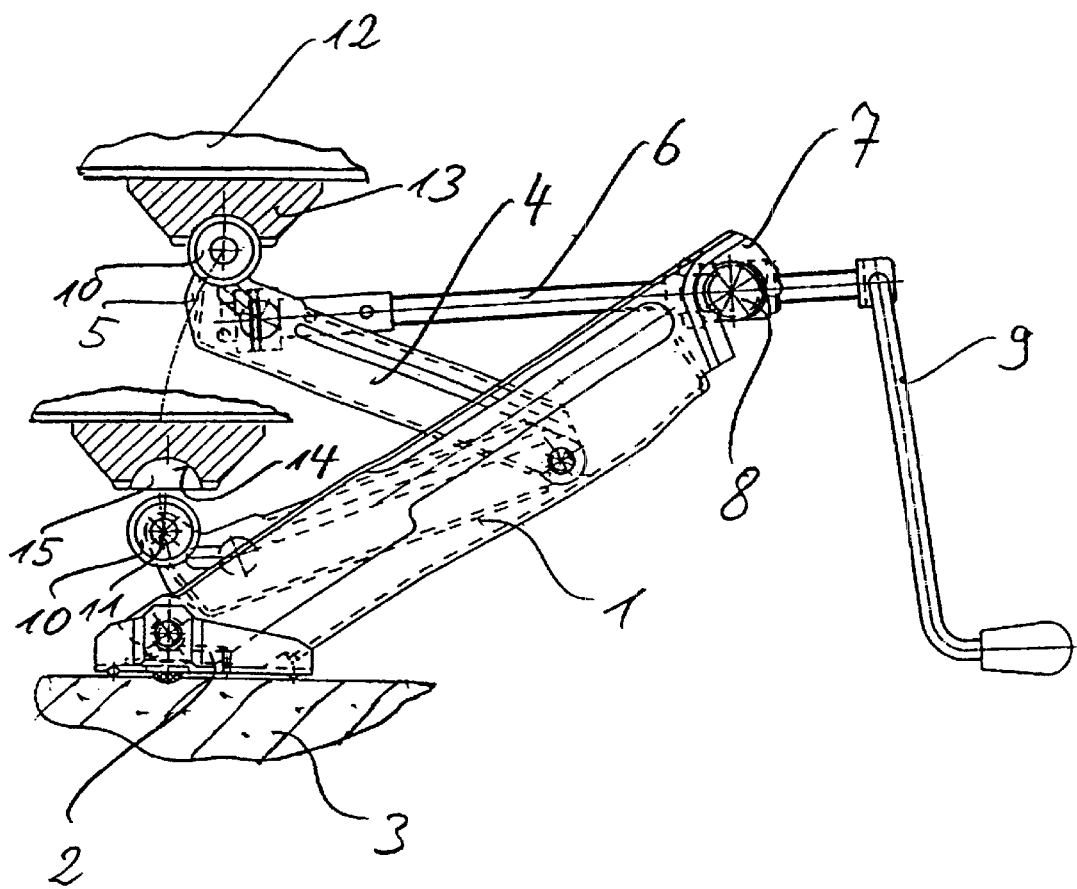

The version illustrated in FIG. 2 features a roller 10 mounted on the outside of each flange at the free end 5 of load-supporting arm 4. The two rollers are accordingly separated. Both are the same size, and the rear roller is hidden by the front roller.

When the load-supporting arm is provided with two rollers 10 as in the version illustrated in FIG. 2, vehicle-accommodating component 13 can be simpler in that the arm's web 16 can be left intact at free end 5 and allowed to span recess 14. It is web 16 itself that in this version will engage component 13 between the rollers.

Figure 3:
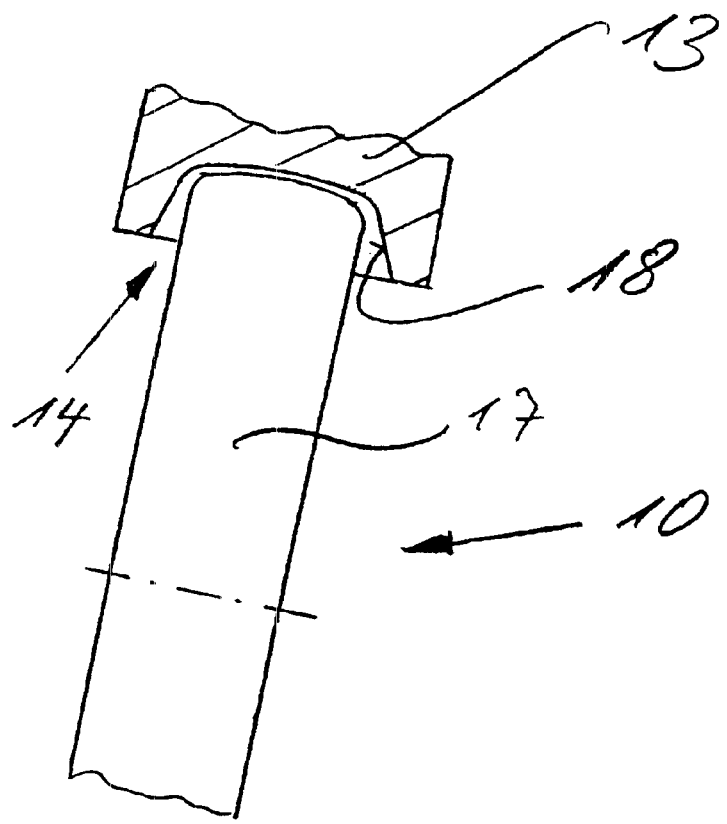
Figure 4:
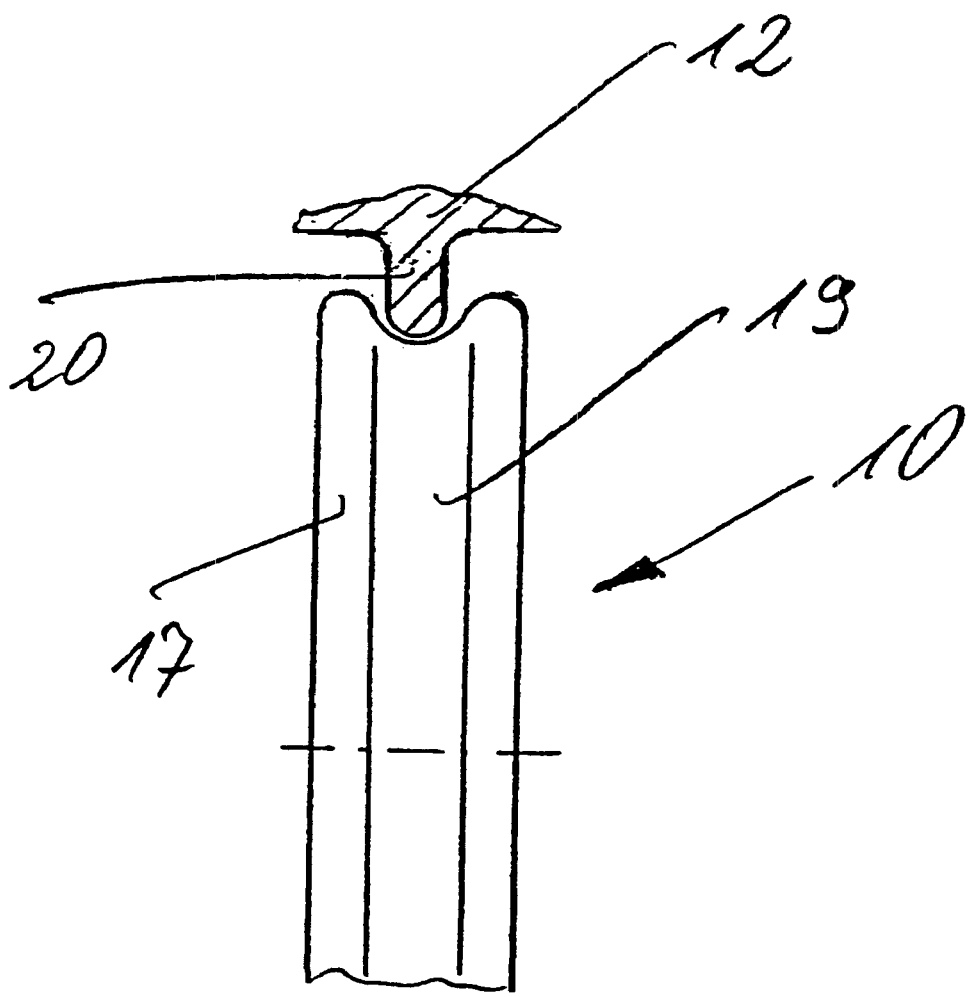

FIGS. 3 and 4 are details of different versions of the single roller 10 at the free end 5 of load-supporting arm 4 in the version of the jack depicted in FIG. 1. The roller 10 in FIG. 3 has a bulging edge 17 that engages a recess 14. The base of the recess is either flat or, as illustrated, slightly concave, and it will accordingly come into contact with the wheel at a single point. The sides 18 of recess 14 slope outward, preventing roller 10 from exerting force against them if the jack is applied askew. The advantage of this approach to supporting the load is that no momentum will be introduced into the load-supporting arm in particular, even when the jack is erected on uneven ground and accordingly not perpendicular to the vehicle's bottom or sill.

The same advantage can be achieved with the roller 10 illustrated in FIG. 4. The edge 17 of this roller is provided with a continuous and constantly concave groove 19.

When the jack is applied, groove 19 will engage a ridge 20. This ridge can, like the recess 14 illustrated in FIG. 4, either be molded directly out of the vehicle's bottom or sill for example. Ridge 20 or recess 14 can, however, alternatively be accommodated as illustrated in or on a vehicle-accommodating component 13 fastened to the bottom or sill. The walls of ridge 20 can, like the walls 15 illustrated in FIG. 1, slope slightly outward. They can on the other hand be vertical, in which event structures like clamped-on strips of plastic will need to be provided in order to secure the ridge in position.

LIST OF PARTS 1. leg
2. foot 3. ground
4. load-supporting arm
5. free end of load-supporting arm
6. threaded shaft
7. upper end of leg
8. traveling nut
9. crank
10. roller
11. roller shaft
12. vehicle bottom or sill
13. vehicle-accommodating component
14. recess
15. wall
16. web
17. edge
18. side
19. groove
20. ridge

What is claimed is:

1. An automotive jack with a vertical main structure resting on a ground and comprising: a leg, a foot, and a load supporting arm swingable around a fixed horizontal axis on said leg; a threaded shaft for raising said arm away from and lowering toward the ground; a vehicle-engaging component with a free end and having a convex adapter head at said free end; said adapter head engaging a matching concave recess below a bottom of a vehicle being lifted, said convex adapter head comprising roller means on roller shaft means on said free end of said load-supporting arm, said roller means engaging said matching concave recess for supporting said vehicle while being raised or lowered.

2. The automotive jack as defined in claim 1, said load-supporting arm has a U-shaped cross-section with flanges, said convex adapter head being located between said flanges.

3. The automotive jack as defined in claim 2, wherein said concave recess is laterally demarcated by walls laterally enclosing said adapter head.

4. The automotive jack as defined in claim 1, including two adapter heads, one of said heads being against outside of walls at said free end of said arm.

5. The automotive jack as defined in claim 4, wherein said concave recess has a web; pin means between said adapter heads.

6. The automotive jack as defined in claim 1, wherein each of said rollers has a bulging edge.

7. The automotive jack with a vertical main structure as defined in claim 1, wherein said adapter head engages a matching concave recess below a sill of a vehicle being lifted.

8. The automotive jack as defined in claim 1, wherein said jack is securable parallel to the vehicle's length.

9. The automotive jack as defined in claim 1, wherein said convex adapter head comprises rollers on said free end of said load-supporting arm, said load-supporting arm having a U-shaped cross-section with flanges, said convex adapter head being located between said flanges, said jack being securable parallel to the vehicle's length.

10. An automotive jack with a vertical main structure resting on a ground and comprising a leg, a foot, and a load supporting arm swingable around a fixed horizontal axis on said leg, a threaded shaft for raising said arm away from and lowering toward the ground by a threaded shaft; a vehicle-engaging component with a free end and having a convex adapter head at said free end; said adapter head having a continuous groove engaging a ridge with a concave edge.

11. The automotive jack as defined in claim 10, wherein said ridge extends up below a bottom of a vehicle and across a direction of travel.

12. The automotive jack as defined in claim 10, wherein said adapter head has a continuous groove engaging a ridge with a flat edge.

13. The automotive jack as defined in claim 10, wherein said ridge extends up below a sill of a vehicle and across a direction of travel.

14. The automotive jack as defined in claim 10, wherein said jack is securable parallel to the vehicle's length.

15. The automotive jack as defined in claim 10, wherein said convex adapter head comprises rollers on said free end of said load-supporting arm, said load-supporting arm having a U-shaped cross-section with flanges, said convex adapter head being located between said flanges, said jack being securable parallel to the vehicle's length.

16. The automotive jack as defined in claim 10, wherein said adapter head comprises rollers on said free end of said load-supporting arm, said load-supporting arm having a U-shaped cross-section with flanges, said convex adapter head being located between said flanges; said concave recess being laterally demarcated by walls laterally enclosing said adapter head; an additional adapter head, one of said heads being against outside of said walls at said free end of said arm; said concave recess having a web; each of said rollers having a bulging edge; said ridge extending up below a bottom of a vehicle and across a direction of travel.

17. An automotive jack with a vertical main structure resting on a ground and comprising: a leg, a foot, and a load supporting arm swingable around a fixed horizontal axis on said leg; a threaded shaft for raising one arm away from and lowering toward the ground by a threaded shaft; a vehicle-engaging component with a free end and having a convex adapter head at said free end; said adapter head engaging a matching concave recess below a bottom of a vehicle being lifted; said convex adapter head comprising rollers on said free end of said load supporting arm, said load supporting arm having a U-shaped cross-section with flanges, said convex adapter head being located between said flanges; said concave recess being laterally demarcated by walls laterally enclosing said adapter head; an additional adapter head, one of said heads being outside of walls at said free end of said arm; said concave recess having a web; pin means in said roller between said adapter heads; each of said rollers having a bulging edge; said ridge extending up below a bottom of a vehicle and across a direction of travel.

* * * * *